(12) United States Patent
Comeau

(10) Patent No.: US 6,787,757 B2
(45) Date of Patent: Sep. 7, 2004

(54) APPARATUS AND METHODS FOR GENERATING AN ELECTRONIC SIGNAL RESPONSIVE TO SELECTED LIGHT

(75) Inventor: Alain R. Comeau, Carlsbad, CA (US)

(73) Assignee: Microsemi Corporation, Irvine, CA (US)

( * ) Notice: Subject to any disclaimer, the term of this patent is extended or adjusted under 35 U.S.C. 154(b) by 56 days.

(21) Appl. No.: 09/847,908

(22) Filed: May 3, 2001

(65) Prior Publication Data

US 2002/0162950 A1 Nov. 7, 2002

(51) Int. Cl.[7] ................................................. G01J 3/50
(52) U.S. Cl. ................................. 250/226; 250/214.1
(58) Field of Search .............................. 250/226, 214.1; 257/440; 358/513, 514; 348/272; 356/405, 406, 408, 411, 425, 218, 224, 326

(56) References Cited

U.S. PATENT DOCUMENTS

| | | | |
|---|---|---|---|
| 3,617,753 A | * | 11/1971 | Kato et al. ................... 257/443 |
| 4,804,833 A | * | 2/1989 | Matsubara et al. ...... 250/214 R |
| 5,545,891 A | | 8/1996 | Smith |
| 5,556,423 A | | 9/1996 | Chow et al. |
| 5,747,860 A | | 5/1998 | Sugiyama et al. |
| 5,747,863 A | * | 5/1998 | Shoda ......................... 250/332 |
| 5,796,118 A | | 8/1998 | Morikawa et al. |
| 5,818,322 A | | 10/1998 | Tasumi |
| 5,999,271 A | * | 12/1999 | Shih et al. ............... 250/214 R |
| 6,140,156 A | | 10/2000 | Tsai |
| 6,146,957 A | | 11/2000 | Yamasaki |
| 6,249,346 B1 | | 6/2001 | Chen et al. |
| 6,427,087 B1 | | 7/2002 | Chow et al. |
| 6,445,021 B1 | | 9/2002 | Chen et al. |
| 6,455,831 B1 | * | 9/2002 | Bandera et al. .......... 250/208.1 |

* cited by examiner

Primary Examiner—Thanh X. Luu
Assistant Examiner—Stephen Yam
(74) Attorney, Agent, or Firm—Jackson Walker LLP; Michael Cameron, Esq.; Robert Klinger, Esq.

(57) ABSTRACT

Disclosed are apparatus and methods for generating an electronic signal responsive to selected wavelengths of the optical spectrum. An optical thickness differential between two or more photoconductors is used to generate an electronic signal calibrated to be representative of light signals of a selected range of wavelengths.

9 Claims, 4 Drawing Sheets

APPARATUS AND METHODS FOR GENERATING AN ELECTRONIC SIGNAL RESPONSIVE TO SELECTED LIGHT

TECHNICAL FIELD

The present invention relates to photoconductive apparatus and methods for generating an electronic signal responsive to selected wavelengths of light. More specifically, the invention relates to apparatus and methods that use photoconductor responses to light in order to provide an electronic output signal corresponding to selected wavelengths. In particular, the apparatus and methods of the invention provide improved wave length specific photosensors with improved sensitivity and responsivity.

BACKGROUND OF THE INVENTION

Electromagnetic energy is generally thought of as occupying a spectrum (FIG. 1) of wavelengths or frequencies having no inherent upper or lower bounds. The electromagnetic spectrum includes radio waves, x-rays, gamma rays, and the optical spectrum, or light. In general, light occupies a segment of the continuous spectrum of electromagnetic waves from about $10^{-3}$ meters wavelength, or infrared, up to about $10^{-11}$ meters in wavelength, or x-rays. The center of the visible region, or visible light, is at about 555 nanometers in wavelength, which corresponds to yellow-green. Generally, 400 nanometers to 700 nanometers is considered the range for visible light.

Light has a dual nature, it behaves as both a wave and as a particle. A photon is a particle associated with light. Photons can have different energies. When light illuminates a semiconductor, the photons with sufficient energy are absorbed by the material. The electrons from the semiconductor valence band receive enough energy to jump to the conduction band. The conductivity increases due to the higher number of electrons in the conduction band. The electron needs a minimum energy to jump to the conduction band. This minimum energy is the energy gap between the valence band and the conduction band. Photons with energies greater than the energy band gap of the material will be absorbed. Photoconductivity is the increase of current in a semiconductor due to the absorption of photons. A photoconductor converts information and energy from an optical form to an electronic form.

Photodiodes are semiconductor devices that convert light into electrical signals. There are several kinds of semiconductor photodiodes. All work on the principle of photoconductivity. A photodiode has a P-N junction that is reverse biased. Reverse bias means that a positive bias is applied on the N-side of the diode and a negative bias is applied on the P-side of the diode. In the reverse bias P-N junction, no current flows. When an incident photon strikes the P-N junction, it is absorbed and an electron-hole pair is created. The electron and the hole are carried through the junction in opposite directions, creating a current in the photodiode. Photodiodes made from different semiconductor materials are sensitive to different wavelengths of light. Silicon, for example, the most prevalent semiconductor, is sensitive to both visible light and infrared light. Gallium-Arsenide (GaAs) semiconductors are known for sensitivity to both visible and ultraviolet light.

Photodiodes exist in the art for converting various segments of the optical spectrum into electrical signals. For example, visible light photodiodes and ultraviolet photodiodes are known. Difficulties arise, however, in producing photodiodes responsive only to selective wavelengths. Oftentimes the materials used are inherently more sensitive to some wavelengths than others. For example, a serious problem associated with silicon-based visible-light photodiodes known in the art is an unwanted responsiveness to infrared light. One approach to eliminating the infrared response is to use external filters in an attempt to screen out infrared wavelengths. This attempted solution has several shortcomings, important among which are a loss of responsivity in the visible range, increased expense and increased complexity. Another approach to attempting to eliminate unwanted infrared light from visible-light photodiodes is to adjust the wavelengths upon which the device is centered downward, away from the infrared end of the spectrum. This attempted solution results in a loss of sensitivity at the higher frequency end of the visible spectrum.

Photosensitive apparatus and methods able to provide increased responsivity to a particular range of wavelengths without loss of sensitivity would have numerous advantages and uses. Additional advantages, including reduced cost and complexity, would accrue if such apparatus were offered as an integrated unit.

SUMMARY OF THE INVENTION

The invention provides apparatus for generating an electronic signal in response to light. A first sensor is provided for converting light to a first electronic signal. A second sensor is provided for converting light to a second electronic signal. A circuit is also provided, for manipulating the first and second electronic signals to generate an output signal responsive to the light.

According to another aspect of the invention, a first photodiode converts light to a first electronic signal. A second photodiode converts light to a second electronic signal. A circuit manipulates the first and second electronic signals to generate an output signal responsive to the light.

According to one aspect of the invention the first and second sensors have a different spectral sensitivity provided by using photodiodes with dissimilar optical thicknesses.

According to the methods of the invention, an electronic signal corresponding to light is generated. The method includes the step of converting light into first and second electronic signals. In another step, the first and second electronic signals are manipulated to generate an output signal corresponding to the light.

Numerous advantages are provided by the invention, including but not limited to reduced response and sensitivity to near infra-red light. The invention also provides a corresponding elimination of sensitivity and responsiveness to deselected wavelengths of light. Advantages of reductions in cost and complexity are realized by the invention in providing an improved integrated wave-light responsive photoconductive apparatus not requiring additional or external components such as filters. These and many other advantages related to the improvements of the invention will become apparent to persons skilled in the relevant arts through careful reading of the disclosure and claims presented herein.

BRIEF DESCRIPTION OF THE DRAWINGS

For a better understanding of the invention including its features, advantages and specific embodiments, reference is made to the following detailed description along with accompanying drawings in which.

References in the detailed description correspond to like references in the figures unless otherwise noted. Like numerals refer to like parts throughout the various figures. Descriptive and directional terms such as top, bottom, left, right, first, second, refer to the drawings themselves as laid out on the paper and not to physical limitations of the invention unless specifically noted.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. It should be understood that the invention may be practiced with photoconductive devices of various types and materials and may be practiced on various segments of the electromagnetic spectrum. Some features of embodiments shown and discussed are simplified or exaggerated for illustrating the principles of the invention.

Figure 2:
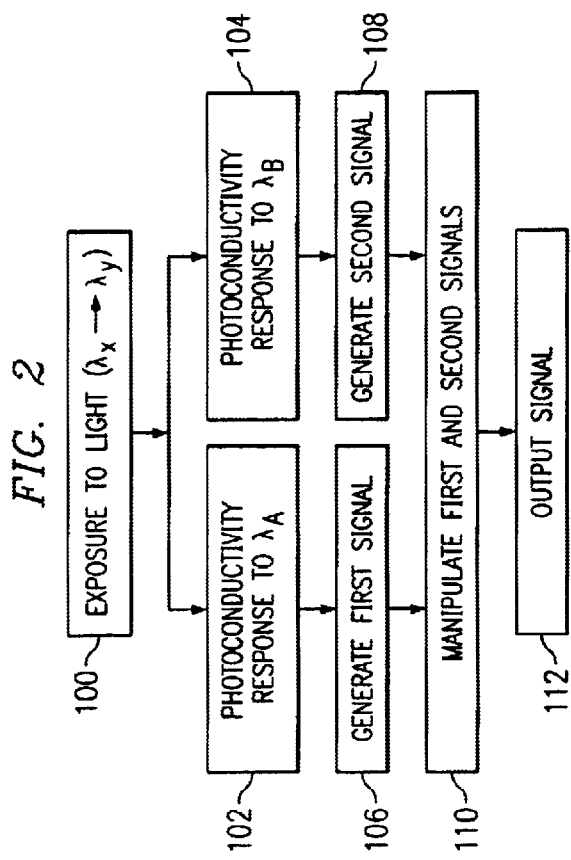
FIG. 2 is a process flow diagram showing the steps of the method of the invention.

FIG. 2 is a process flow diagram showing the steps and the method of the invention. Preliminarily, it is assumed that the invention is exposed to light 100. The light contains a continuum of wavelengths here represented by $\lambda_x$–$\lambda_y$. In step 102 and concurrent step 104, a non-identical photoconductivity response is obtained to light spectrum within the continuum $\lambda_x$–$\lambda_y$, here represented by $\lambda_A$, shown in step box 102 and $\lambda_B$, shown in step box 104. The photoconductivity responses generated in steps 102 and 104 result in first and second electronic signals, shown respectively by steps 106 and 108. In step 110, the first and second electronic signals are manipulated, preferably by a circuit further described below. The principle of the manipulation step 110 is to use the differential between responses to $\lambda_A$ and $\lambda_B$ to produce a calibrated electronic signal. Thus, one electronic signal, for example, the first electronic signal, may be used to calibrate another electronic signal, in this example, the second electronic signal. Accordingly, in step 112, an output signal is generated which corresponds to a pseudo-spectrum of light. This general description of the methods of the invention will become increasingly clear in light of the further description which follows.

Figure 1:
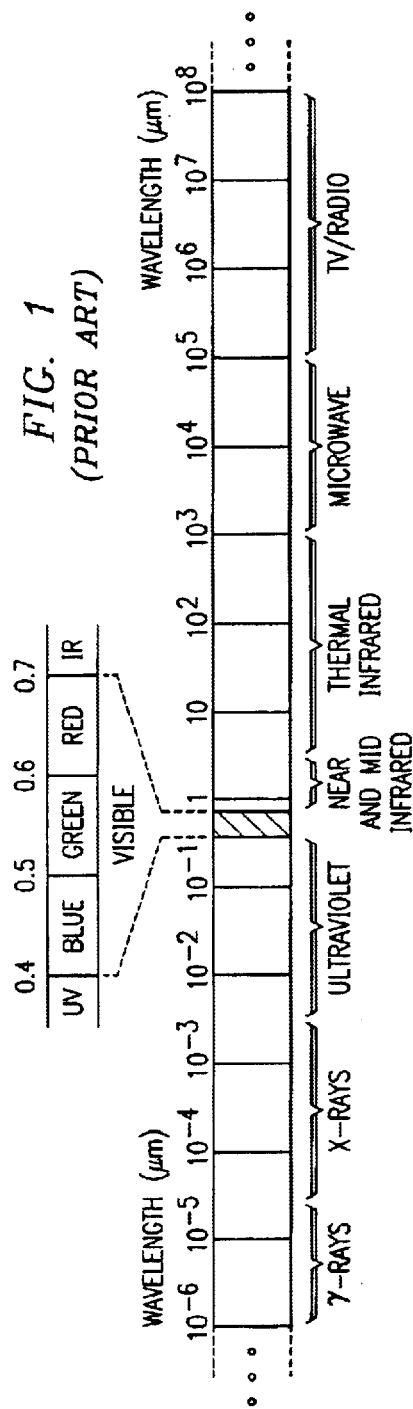
FIG. 1 is a graphical representation of a portion of the electromagnetic spectrum known in the arts.
Figure 3A:
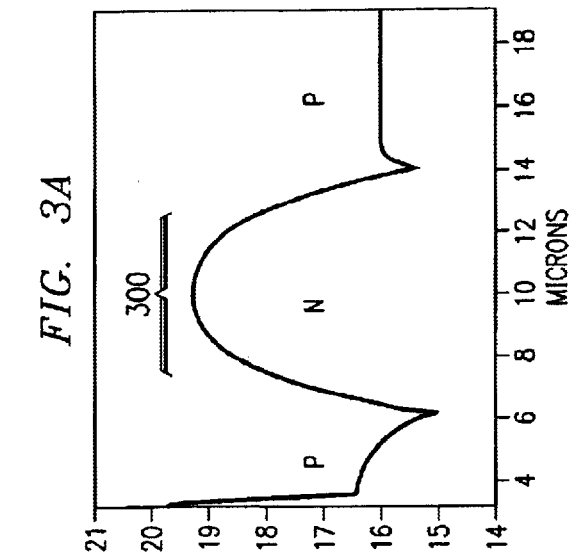
FIG. 3A is a graphical representation of the transition region of photodiode A of FIG. 3.
Figure 3:
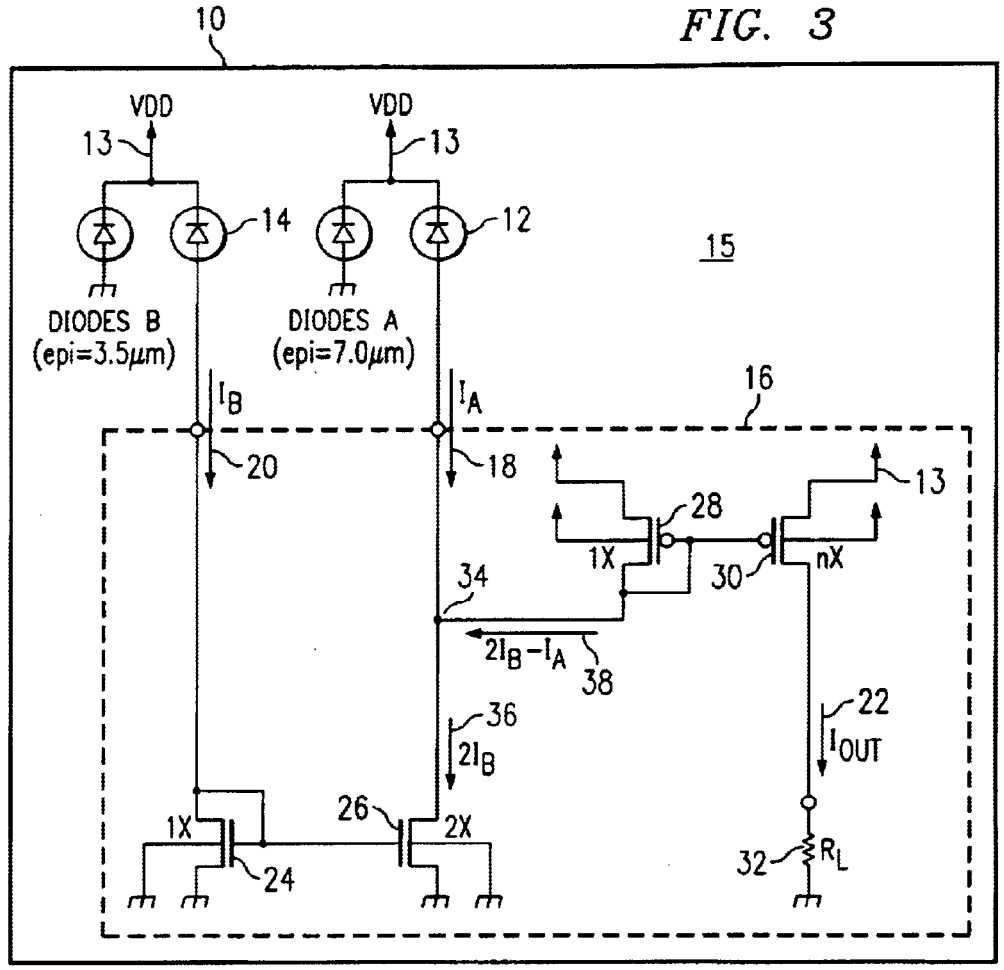
FIG. 3 is a schematic diagram showing a preferred invention embodiment of a wavelength responsive electronic signal generating apparatus.

A preferred embodiment of an apparatus 10 according to the principles of the invention, is shown in FIG. 3. A first pair of photodiodes A 12 is connected to a power source 13 (not part of the invention). The photodiode pair A 12 is positioned for exposure to ambient light. Although a pair of photodiodes A 12 is shown, the left photodiode shown in FIG. 3 leaks current to the substrate 15. In other words, only the current from one of the photodiodes A 12, in this example, the one on the right, is employed in the remainder of the circuit 16. For convenience, the term photodiode A 12 is used hereinafter to refer to the pair. In this example, the invention is used to generate a response to ambient visible light. Of course, it will be appreciated that the invention may be practiced for other segments of the spectrum such as, for example, ultraviolet. Photodiode A 12 is preferably silicon-based but may be made with other semiconductor materials, such as GaAs. As shown, a second pair of photodiodes B 14, hereinafter photodiode B 14, is also operably coupled to a power source 13. Photodiode B 14 is also preferably made from silicon semiconductor material, although other materials could also be used. Photodiode B is exposed to the light source. It should be understood that photodiodes A and B, 12, 14, of the invention are exposed to the same light source ($\lambda_x$–$\lambda_y$ of FIG. 2). Photodiode A 12 preferably has an optical thickness of about 7.0 micrometers. The optical thickness of photodiode B 14 is preferably about 3.5 micrometers. A brief discussion of optical thickness is provided below.

Figure 3B:
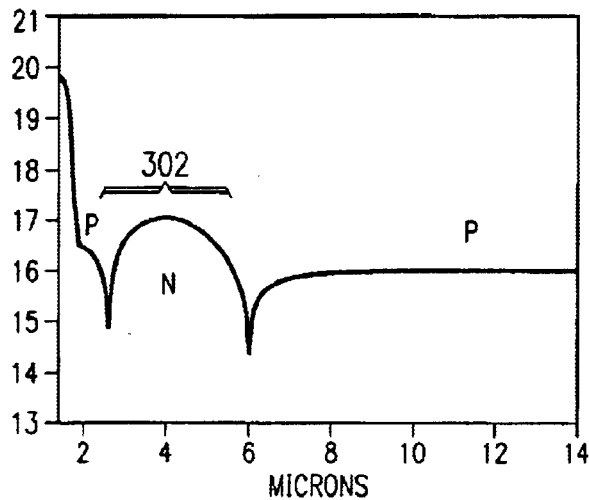
FIG. 3B is a graphical representation of the transition region of photodiode B of FIG. 3.

The term "optical thickness" is used in the art with reference to the transfer of radiant energy. As used herein, the term "optical thickness" means the thickness of a light-absorbing material lying in a vertical column from a surface. FIG. 3A is a graphical representation showing the preferred doping profile for photodiode A 12. The N-type buried layer 300 at a depth of about 7.0 micrometers creates a built-in electric field which defines the optical thickness of photodiode A 12. FIG. 3B is a graphical representation of the preferred doping profile for photodiode B. The N-type buried layer 302 at the depth of about 3.5 micrometers creates a built-in electric field which defines the optical thickness of photodiode B 14. The optical thickness of photodiode A 12 is preferably approximately 7.0 microns and the optical thickness of photodiode B 14 is approximately 3.5 microns. These optical thicknesses are preferred because of their respective inherent responses to light. With silicon, an optical depth of about 3.5 microns (photodiode B) provides apeak response at the peak response of the human eye, about 555 nm.

The choice of about 7.0 microns of optical thickness for photodiode A is made because it provides approximately twice as much current due to the near-infrared light as the 3.5 micron photodiode (B). This optical thickness differential (optical thickness ratio), and corresponding near infrared (IR) response differential (currents ratio), is advantageous because it allows one to cancel near-IR pseudo-response if one multiplies the thin photo-diode current (B 14) by the thickness differential (thickness differential=thick photodiode thickness divided by thin photo-diode thickness) and further subtract the thick photodiode current. Of course, other optical thickness differentials may be used within the principles of the invention, provided additional components of the invention are adjusted accordingly.

With continued reference to FIG. 3, the remainder 16 of the circuit is preferably arranged as shown. According to the present example, the current from first photodiode A 12 is represented by $I_A$ arrow 18 and the current from second photodiodes B is shown by $I_B$ arrow 20. The $I_{out}$ arrow 22 represents the output signal of the apparatus 10. It should be understood by those skilled in the arts that the function of circuit 16 and the photodiodes 12, 14 is to perform the mathematical manipulation $I_{out}=n*(I_B-(I_A-I_B))$. Of course, it will be apparent to those skilled in the arts that many alternative circuit arrangements may be substituted. The exact optical thickness differential and circuitry 16 is not essential to the principles of the invention so long as a signal differential is provided which will enable the elimination of signals corresponding to responses to unwanted wavelengths in order to produce a calibrated response to selected wavelengths.

As can be seen from the present example, transistors 24, 26, 28, 30, make up the remainder of the circuit 16, along with a load resistance 32. The circuit 16 shown in FIG. 3 includes a current multiplier of transistors 24 and 26 by which current $I_B$ is multiplied by a factor of 2. Thus, the current at node 34 is shown by current $I_A$ (arrow 18) and current $2I_B-I_A$ (arrow 38). At the load resistor 32, the output signal represented by arrow 22 $I_{out}$, which is appropriately scaled by transistor 30 so that $I_{out}=n*(I_B-(I_A-I_B))$. It will be clear to those skilled in the arts that the circuit 16 configuration and type and arrangement of transistors is not essential so long as the equation for $I_{out}$ is true. The output signal $I_{out}$ provides a signal corresponding to the desired wavelengths, in this case, $\lambda_b$, which may be used to initiate controls for a larger device, such as a display backlighting adjustment or simply to provide measurement data relating to $\lambda_B$.

An example of an application of the invention is in a Liquid Crystal Display (LCD) backlighting control. The invention may be used advantageously in such an application in order to control the amount of backlighting required to permit a user to easily see what is on the LCD display. For example, the invention may be constructed to be responsive to visible light, as in the example herein, so that the LCD backlighting be adjusted according to ambient lighting conditions to provide an optimal display for a human user. The advantages of the use of the invention in such an application include the close approximation of an output signal similar to the response of the human eye, a low cost backlighting control, and relative insensitivity to ambient temperature.

Figure 4:
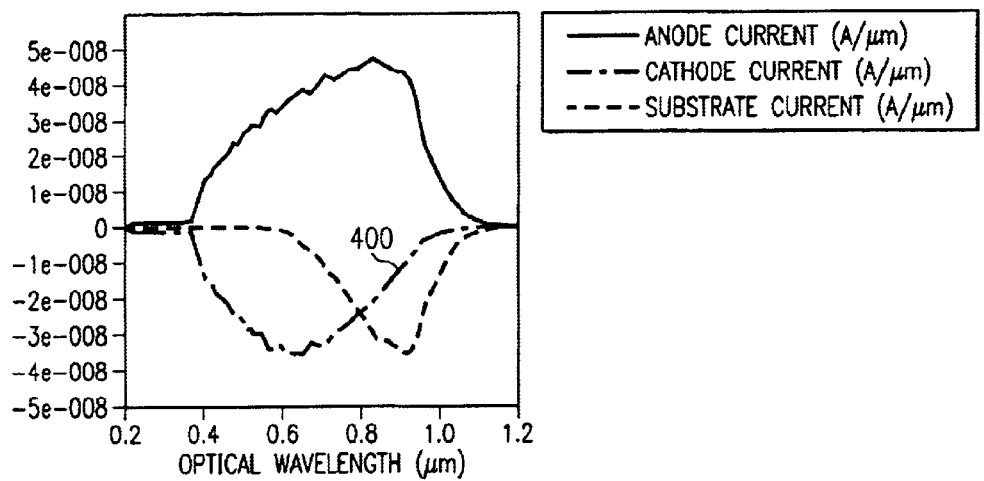
FIG. 4 is a graphical representation of the current in photodiode A during the use of the preferred embodiment of the invention of FIG. 3.

FIG. 4 shows the current in photodiode A, at the cathode, as a result of the capture of light above the N-buried region, the anode. As can be seen from FIG. 4, the approximate center of the photodiode A current 401 appears at about 0.7 micrometers in wavelength, corresponding to infrared.

Figure 5:
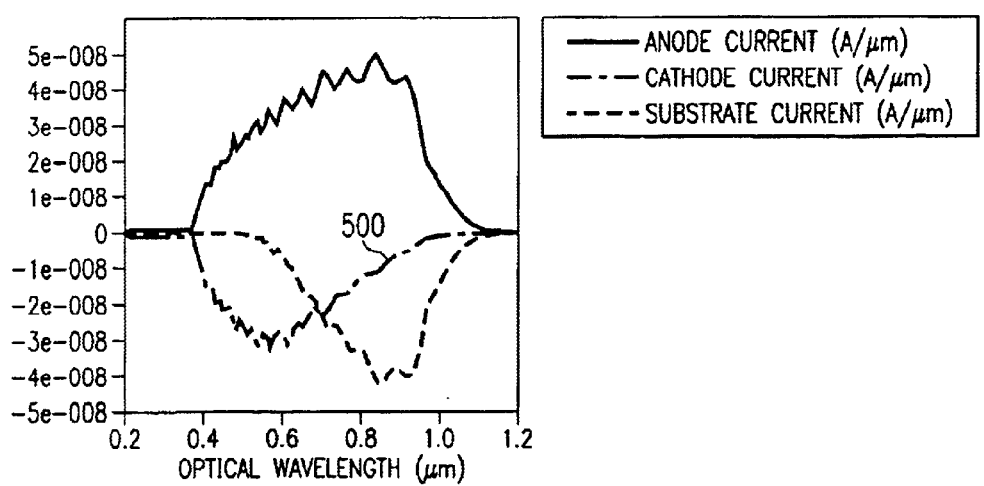
FIG. 5 is a graphical representation of the current in photodiode B during the use of the preferred embodiment of the invention of FIG. 3.

FIG. 5 is a representation of the current flow in photodiode B during the use of the device in the presence of visible light. The current 402 in photodiode B, at the cathode, is a result of the light captured above the N-buried region, the anode of the device. As can be seen from FIG. 5, the current is approximately centered at about 0.5 micrometers wavelength, the approximate center of the human-visible range.

Figure 6:
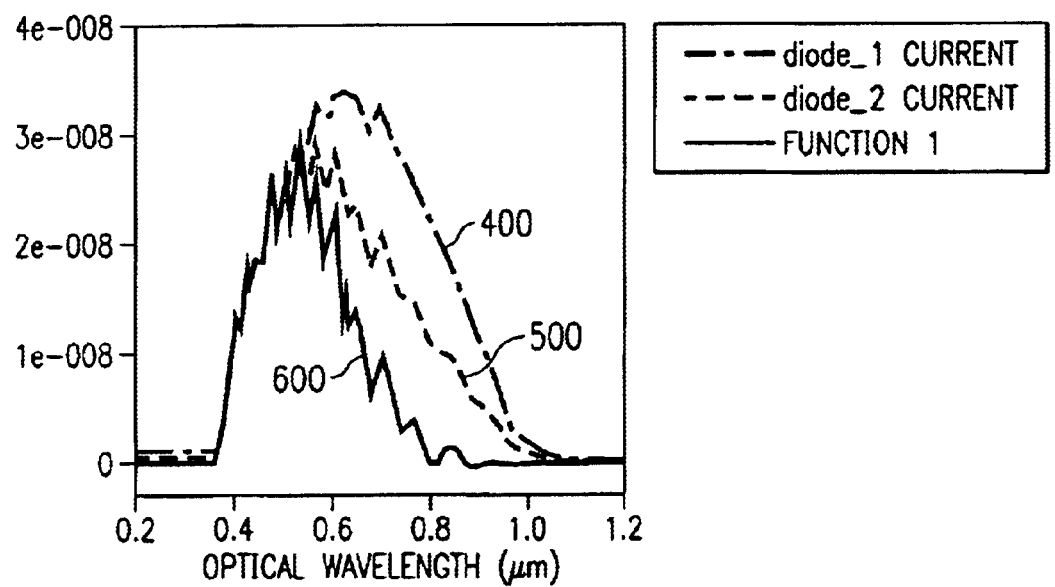
FIG. 6 is a graphical representation of an example of the output signal of the invention of FIG. 3 superimposed with the current responses of FIGS. 4 and 5.

FIG. 6 depicts the photodiode A and photodiode B currents of FIGS. 4 and 5 on an inverted scale (negative up). One aspect of silicon used by the invention is demonstrated by FIG. 6. Regardless of the thickness, silicon photodiodes cut off at about 1.0 micrometers of wavelength. FIG. 6 also illustrates how the optical thickness differential between photodiode A and photodiode B may be used to provide the desired photo response. The slope of the electronic signal conversion to a wavelength of about 1.0 micrometers is, due to the properties of silicon, approximately proportional to the optical thickness (see curves 601 and 603). Subtracting the difference in currents between photodiode A and photodiode B from the signal of photodiode B, the much reduced response represented by curve 600 is obtained. Curve 601 represents the current from the 3.5 microns thick photodiode B and curve 603 represents the current from the 7.0 microns thick photodiode A. As can be seen from curve 600, the manipulation of the separate photodiode signals, in this case $I_{out}=n*(I_B-(I_A-I_B))$ results in signal 600 centered at approximately 555 nanometers wavelength and cancellation of the near infra-red response above 800 nanometers.

Figure 7:
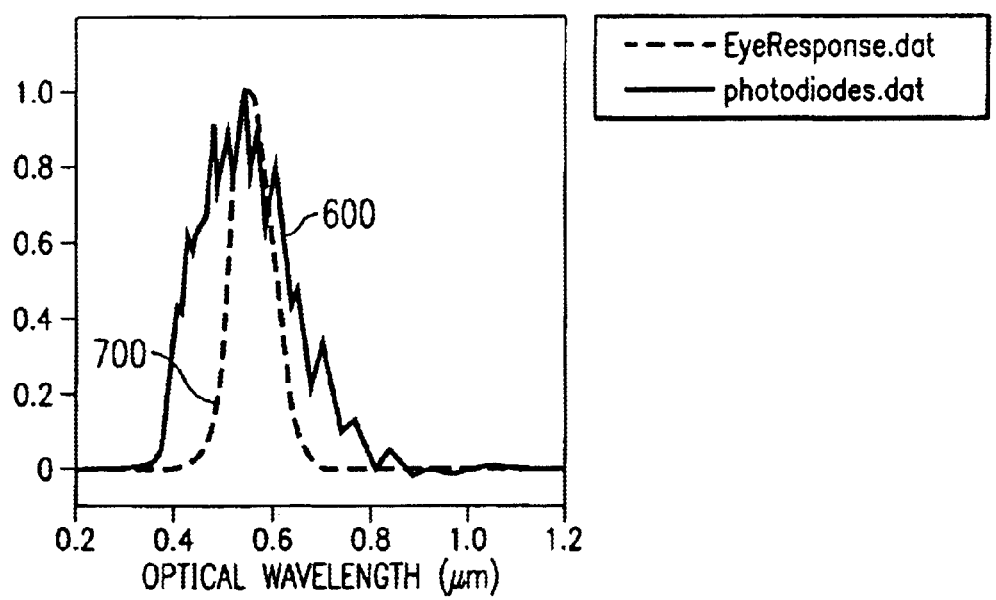
FIG. 7 is a graphical representation of the output signal of FIG. 6 superimposed with the theoretical response for a typical human eye to visible light.

As shown in FIG. 7, the signal 600 discussed with reference to FIG. 6 is superimposed upon the theoretical response for a typical human eye to visible light, signal 700. It should be appreciated by those skilled in the arts that the invention may also be practiced for intervals of light centered on other wavelengths. It should also be understood that the optical thickness differential may be varied without departure from the concept of the invention. For example, if photodiode A were three times the optical thickness of photodiode B, thus $I_{out}=n*(I_B-\frac{1}{2}(I_A-I_B))$.

The embodiments shown and described above are only exemplary. Even though numerous characteristics and advantages of the present invention have been set forth in the foregoing description together with details of the method of the invention, the disclosure is illustrative only and changes may be made within the principles of the invention to the full extent indicated by the broad general meaning of the terms used in the attached claims.

I claim:

1. Apparatus for generating an electronic signal in response to light, comprising:

a first photodiode for converting light to a corresponding first electronic signal;

a second photodiode for converting the light to a corresponding second electronic signal;

a circuit for manipulating the first and second electronic signals to generate an output signal in response to the light;

one of either the first silicon photodiode or the second photodiode having an optical thickness of about 7.0 micrometers; and and the other silicon photodiode having an optical thickness of about 3.5 micrometers; further comprising a circuit operable to multiply the first electronic signal by the ratio of the optical thicknesses of the second photodiode to the first photodiode to obtain a first product;

and thereafter, the circuit operable to subtract the second electronic signal from the first product, so as to obtain a reduced lone wavelength response in the near infrared and a resultant spectral response similar to a human eye.

2. The apparatus of claim 1 wherein the circuit for manipulating the first and second signals comprises a scaling function.

3. The apparatus of claim 1 wherein the circuit for manipulating the first and second signals comprises an arithmetic logic circuit.

4. The apparatus of claim 1, wherein the multiplication of the first electronic signal by the ratio of optical thicknesses of the second photodiode to the first photodiode and the subtraction of the second electronic signal from the result of the multiplication operation is performed using one or a plurality of analog current mirrors.

5. The apparatus of claim 1 wherein the first photodiode and the second photodiode are made of silicon.

6. The apparatus of claim 1 wherein the first photodiode and the second photodiode are made of a semiconductor material other than silicon.

7. Apparatus for generating an electronic signal in response to light comprising:
- a first sensor for converting the light to a corresponding first electronic signal;
- a second sensor for converting the light to a corresponding second electronic signal; wherein the first and second sensors are provided with a spectral sensitivity differential;
- a circuit for manipulating the first and second electronic signals to generate an output signal in response to the light;
- the first sensor comprising a first silicon photodiode with an optical thickness of about 7.0 micrometers; and
- the second sensor comprising a second silicon photodiode with an optical thickness of about 3.5 micrometers.

8. The apparatus of claim 7 wherein further comprising a circuit operable to multiply the first electronic signal by the ratio of the optical thicknesses of the second photodiode to the first photodiode to obtain a first product;

and thereafter the circuit operable to subtract the second electronic signal from the first product, so as to obtain a reduced long wavelength response in the near infrared and a resultant spectral response similar to a human eye.

9. The apparatus of claim 7 wherein the circuit for manipulating the first electronic signal and the second electronic signals comprises a scaling function.

* * * * *